(12) United States Patent
Ueno et al.

(10) Patent No.: US 12,704,752 B2
(45) **Date of Patent: *Aug. 11, 2026**

(54) OPTICAL SHEET LAMINATE, BACKLIGHT UNIT, LIQUID CRYSTAL DISPLAY DEVICE, INFORMATION EQUIPMENT, AND PRODUCTION METHOD FOR BACKLIGHT UNIT

(71) Applicant: KEIWA Incorporated, Tokyo (JP)

(72) Inventors: Hiroaki Ueno, Tokyo (JP); Chengheng Tsai, Tokyo (JP)

(73) Assignee: KEIWA Incorporated, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/188,264

(22) Filed: Apr. 24, 2025

(65) Prior Publication Data

US 2025/0251627 A1 Aug. 7, 2025

Related U.S. Application Data

(63) Continuation of application No. 18/784,137, filed on Jul. 25, 2024, now Pat. No. 12,345,980, which is a (Continued)

(30) Foreign Application Priority Data

Jan. 28, 2022 (JP) ................................ 2022-011688

(51) Int. Cl.
*G02F 1/13357* (2006.01)
*G02F 1/1335* (2006.01)

(52) U.S. Cl.
CPC .. *G02F 1/133607* (2021.01); *G02F 1/133603* (2013.01)

(58) Field of Classification Search
CPC ..................... G02F 1/133606; G02F 1/133607
See application file for complete search history.

(56) References Cited

U.S. PATENT DOCUMENTS 7,320,538 B2 1/2008 Ko
12,135,479 B2 11/2024 Tsai
(Continued)

FOREIGN PATENT DOCUMENTS

CN 1841151 A 10/2006
EP 4296728 12/2023
(Continued)

OTHER PUBLICATIONS

Extended European Search Report for EP Patent Application No. 22924052.8 dated Mar. 28, 2025, (8 pages).
(Continued)

*Primary Examiner* — Sean P Gramling
(74) *Attorney, Agent, or Firm* — JCIPRNET

(57) ABSTRACT

An optical sheet laminate 100 is built in a backlight unit 40. The optical sheet laminate 100 includes a plurality of diffusion sheets 43 each having a first surface 21*a* having a plurality of recesses 22 having a substantially inverted quadrangular pyramid shape, and a pair of prism sheets 44 and 45 arranged above the plurality of diffusion sheets 43 and having prism extending directions perpendicular to each other. The recesses 22 have an apex angle of 95° or more. The recesses 22 are arrayed in a two-dimensional matrix. The prism extending direction of a lower prism sheet 44 and the arrangement direction of the recesses 22 on an upper diffusion sheet 43A intersect with each other at an angular difference of 30° or less.

12 Claims, 11 Drawing Sheets

Related U.S. Application Data continuation of application No. PCT/JP2022/042381, filed on Nov. 15, 2022.

(56) References Cited

U.S. PATENT DOCUMENTS

| | | | | |
|---|---|---|---|---|
| 2006/0146566 | A1* | 7/2006 | Ko | G02B 6/0036 362/611 |
| 2007/0171671 | A1 | 7/2007 | Kurokawa et al. | |
| 2020/0292881 | A1* | 9/2020 | Tsai | G02F 1/133611 |
| 2021/0405449 | A1 | 12/2021 | Kim et al. | |
| 2023/0038442 | A1 | 2/2023 | Tsai | |

FOREIGN PATENT DOCUMENTS

| | | | |
|---|---|---|---|
| JP | 2006-302876 | A1 | 11/2006 |
| JP | 2011-129277 | A | 6/2011 |
| JP | 2021-162840 | A | 10/2021 |
| KR | 10-2006-0104639 | A | 10/2006 |
| KR | 10-2007-0003974 | A | 1/2007 |
| KR | 20200109740 | | 9/2020 |
| WO | WO 2005/083475 | A1 | 9/2005 |
| WO | WO 2010/010840 | A1 | 1/2010 |

OTHER PUBLICATIONS

"Search Report of Europe Counterpart Application", issued on Apr. 24, 2026, p. 1-p. 9.

* cited by examiner

APEX ANGLE 90°
APEX ANGLE 95°
APEX ANGLE 100°
APEX ANGLE 105°
RELATIVE LUMINANCE
1.04
1.03
1.02
1.01
1
0.99
0.98
0.97
0.96
0.95
0
10
20
30
40
50
60
70
80
90
ROTATIONAL ANGLE OF UPPER DIFFUSION SHEET

APEX ANGLE 90°
APEX ANGLE 95°
APEX ANGLE 100°
APEX ANGLE 105°
LUMINANCE UNIFORMITY
ROTATIONAL ANGLE OF UPPER DIFFUSION SHEET
190
180
170
160
150
140
130
120
110
100
0
10
20
30
40
50
60
70
80
90

OPTICAL SHEET LAMINATE, BACKLIGHT UNIT, LIQUID CRYSTAL DISPLAY DEVICE, INFORMATION EQUIPMENT, AND PRODUCTION METHOD FOR BACKLIGHT UNIT

CROSS REFERENCE TO RELATED APPLICATIONS

This application is a continuation of U.S. application Ser. No. 18/784,137, filed Jul. 25, 2024, which application is a bypass continuation of International Application No. PCT/JP2022/042381, filed Nov. 15, 2022, which international application claims priority to and the benefit of Japanese Application No. 2022-011688, filed Jan. 28, 2022; the contents of all of which as are hereby incorporated by reference herein in their respective entireties.

BACKGROUND

The present disclosure relates to an optical sheet laminate, a backlight unit, a liquid crystal display device, an information equipment, and a production method for the backlight unit.

Liquid crystal display devices (hereinafter referred to as liquid crystal displays in some cases) have been widely used as display devices for various information equipment such as smartphones and tablet terminals. A major type of a backlight of a liquid crystal display is a direct type in which light sources are arranged on the back surface of the liquid crystal panel.

When the direct type backlight is adopted, an optical sheet such as a diffusion sheet or a prism sheet is used to diffuse light emitted from a light source such as a light emitting diode (LED) to the improve uniformity of luminance and chromaticity over the entire screen (see, e.g., Japanese Unexamined Patent Publication No. 2011-129277). In general, in a direct type backlight unit, two prism sheets whose respective prism ridges perpendicularly cross each other are arranged above a diffusion sheet (i.e., closer to a display screen). Further, to improve the uniformity of luminance in a display screen (in-plane luminance uniformity), a plurality of diffusion sheets may be layered and used.

SUMMARY

As a backlight unit is required to be made thinner, the thickness of a diffusion sheet and the number of layered diffusion sheets are required to be reduced. Further, since the direct type backlight unit has light sources arranged directly below the display screen, the distance between the light sources and the diffusion sheet is also required to be reduced.

However, the reduction in thickness by the thickness of a diffusion sheet or the number of layered diffusion sheets being reduced, the distance between the light sources and the diffusion sheet being reduced, or the like leads to decrease in the in-plane luminance uniformity.

It is an object of the present disclosure to achieve less reduction in the in-plane luminance uniformity even when the backlight unit is made thinner.

To achieve the object, an optical sheet laminate of the present disclosure built in a backlight unit includes: a plurality of diffusion sheets each having surfaces, at least one of which has a plurality of recesses having a substantially inverted quadrangular pyramid shape; and a pair of prism sheets layered above the plurality of diffusion sheets and having prism extending directions perpendicular to each other, wherein the plurality of recesses have an apex angle of 95° or more, the plurality of recesses are arrayed in a two-dimensional matrix, and a prism extending direction of a lower prism sheet which is one of the pair of prism sheets and is closer to the plurality of diffusion sheets and an arrangement direction of the plurality of recesses on an upper diffusion sheet which is one of the plurality of diffusion sheets and is closest to the lower prism sheet intersect with each other at an angular difference of 30° or less.

With the same light sources and the same optical sheet laminate structure, the optical sheet laminate of the present disclosure can provide more significantly increased in-plane luminance uniformity than when the recesses having a substantially inverted quadrangular pyramid shape in each diffusion sheet have an apex angle of less than 95° or when the angular difference between the recess arrangement direction of the upper diffusion sheet and the prism extending direction of the lower prism sheet is more than 30°. This enables less reduction in the in-plane luminance uniformity even when the backlight unit is made thinner by the thickness of the diffusion sheet or the number of layered diffusion sheets being reduced or the like.

In the optical sheet laminate of the present disclosure, when the apex angle is 120° or less, preferably 110° or less, the light diffusing effect by the plurality of recesses can be less reduced.

In the optical sheet laminate of the present disclosure, when another optical sheet is not interposed between the upper diffusion sheet and the lower prism sheet, this enables less degradation in optical characteristics such as the in-plane luminance uniformity and the like attributed to the above other optical sheet.

In the optical sheet laminate of the present disclosure, when the plurality of recesses are provided on the light emission surface, which faces the lower prism sheet, of the upper diffusion sheet, the in-plane luminance uniformity can be more increased than when the recesses are provided on the light incident surface.

In the optical sheet laminate of the present disclosure, when the plurality of diffusion sheets include a lower diffusion sheet on which an arrangement direction of the plurality of recesses is different from the arrangement direction of the plurality of recesses on the upper diffusion sheet, for example, a trade-off can be made between the in-plane luminance uniformity and the luminance by adjustment to the intersecting angle between the recess arrangement direction of the upper diffusion sheet and the recess arrangement direction of the lower diffusion sheet.

A backlight unit of the present disclosure is a backlight unit built in a liquid crystal display device and leading light emitted from a plurality of point light sources toward a display screen, including: the optical sheet laminate of the present disclosure between the display screen and the light sources, and the plurality of diffusion sheets are arranged between the plurality of point light sources and the pair of prism sheets.

The backlight unit of the present disclosure includes the optical sheet laminate of the present disclosure, and this enables less reduction in the in-plane luminance uniformity even when the thickness is reduced.

In the backlight unit of the present disclosure, when the plurality of point light sources are white light sources, the thickness can be easily reduced because it is unnecessary to provide a color conversion sheet.

In the backlight unit of the present disclosure, the plurality of point light sources may be arranged on a reflection sheet provided opposite to the display screen when viewed from the plurality of diffusion sheets. This causes multiple reflections between the diffusion sheets and the reflection sheet thus causing further light diffusion, and thus the in-plane luminance uniformity is further improved.

In the backlight unit of the present disclosure, the distance between the plurality of point light sources and the diffusion sheets may be 5 mm or less, preferably 2.5 mm or less, and more preferably 1 mm or less. This contributes to reduction in the thickness.

A liquid crystal display device of the present disclosure includes the above backlight unit of the present disclosure and a liquid crystal display panel.

The liquid crystal display device of the present disclosure includes the backlight unit of the present disclosure, and this enables less reduction in the in-plane luminance uniformity even when the thickness is reduced.

An information equipment of the present disclosure includes the above liquid crystal display device of the present disclosure.

The information equipment of the present disclosure includes the above liquid crystal display device of the present disclosure, and this enables less reduction in the in-plane luminance uniformity even when the thickness is reduced.

A production method of the present disclosure for a backlight unit is a production method for a backlight unit built in a liquid crystal display device and leading light emitted from a plurality of point light sources toward a display screen. The production method of the present disclosure for a backlight unit includes: arranging and layering a plurality of diffusion sheets between the plurality of point light sources and the display screen, where the plurality of diffusion sheets each have surfaces, at least one of which has a plurality of recesses having a substantially inverted quadrangular pyramid shape; and arranging a pair of prism sheets between the plurality of diffusion sheets and the display screen, where the pair of prism sheets have prism extending directions perpendicular to each other, wherein the plurality of recesses have an apex angle of 95° or more, the plurality of recesses are arrayed in a two-dimensional matrix, and the plurality of diffusion sheets and the pair of prism sheets are arranged so that a prism extending direction of a lower prism sheet which is one of the pair of prism sheets and is closer to the plurality of diffusion sheets and an arrangement direction of the plurality of recesses on an upper diffusion sheet which is one of the plurality of diffusion sheets and is closest to the lower prism sheet intersect with each other at an angular difference of 30° or less.

With the same light sources and the same optical sheet laminate structure, the production method for the backlight unit of the present disclosure can provide more significantly increased in-plane luminance uniformity than when the recesses having a substantially inverted quadrangular pyramid shape in each diffusion sheet have an apex angle of less than 95° or when the angular difference between the recess arrangement direction of the upper diffusion sheet and the prism extending direction of the lower prism sheet is more than 30°. This enables less reduction in the in-plane luminance uniformity even when the backlight unit is made thinner by the thickness of the diffusion sheet or the number of layered diffusion sheets being reduced or the like.

The present disclosure enables less reduction in the in-plane luminance uniformity even when the backlight unit is made thinner.

BRIEF DESCRIPTION OF THE DRAWINGS

FIG. 2 is a cross-sectional view of a backlight unit containing an optical sheet laminate of the embodiment.

DETAILED DESCRIPTION

Embodiment

An optical sheet laminate, a backlight unit, a liquid crystal display device, an information equipment, and a production method for the backlight unit of an embodiment will be described below with reference to the drawings. Note that the scope of the present disclosure is not limited to the following embodiments, and may be altered in any way within the scope of the technical concept of the present disclosure.

Configuration of Liquid Crystal Display Device

Figure 1:
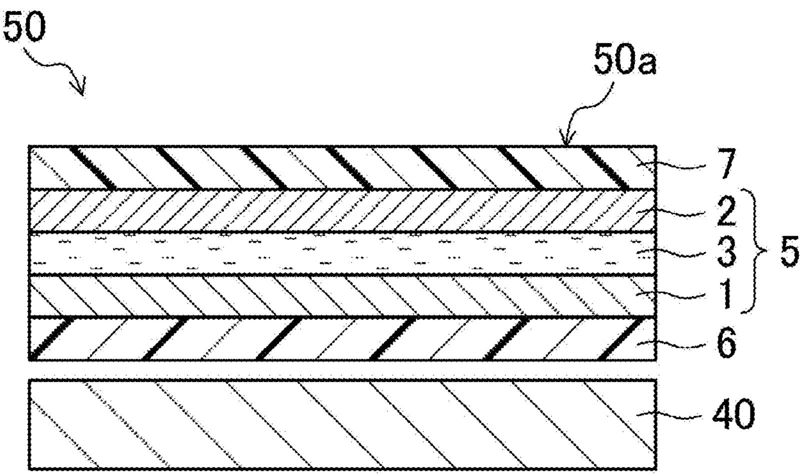
FIG. 1 is a cross-sectional view of a liquid crystal display device including a backlight unit of an embodiment.

As shown in FIG. 1, a liquid crystal display device 50 includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 provided on a back surface side of the liquid crystal display panel 5 with the first polarizing plate 6 interposed.

The liquid crystal display panel 5 includes a TFT substrate 1 and a CF substrate 2 provided so as to face each other, a liquid crystal layer 3 provided between the TFT substrate 1 and the CF substrate 2, and a sealing (not shown) provided in a frame shape to seal the liquid crystal layer 3 between the TFT substrate 1 and the CF substrate 2.

The shape of a display screen 50*a* of the liquid crystal display device 50 viewed from the front (the top in FIG. 1)

is basically a rectangle or a square. Alternatively, the shape may be any shape such as a rectangle with rounded corners, an oval, a circle, a trapezoid, or the shape of an instrument panel of an automobile.

The liquid crystal display device 50 applies a voltage of a predetermined magnitude to the liquid crystal layer 3 in sub-pixels corresponding to pixel electrodes, thereby changing the alignment state of the liquid crystal layer 3. This adjusts the transmittance of light incident from the backlight unit 40 through the first polarizing plate 6. The light whose transmittance is adjusted is emitted through the second polarizing plate 7 to display an image.

The liquid crystal display device 50 of the present embodiment is used as a display device built in various information equipment (e.g., an in-vehicle devices such as a car navigation system; a personal computer; a mobile phone; a portable information terminal such as a laptop and a tablet computer; a portable game machine; a copying machine; a ticket vending machine; an automated teller machine; and the like).

The TFT substrate 1 includes, for example, a plurality of TFTs arranged in a matrix on a glass substrate, an interlayer insulating film arranged in such a manner as to cover the TFTs, a plurality of pixel electrodes arranged in a matrix on the interlayer insulating film and connected to the TFTs, respectively, and an alignment film arranged in such a manner as to cover the pixel electrodes. The CF substrate 2 includes, for example, a black matrix arranged in a lattice manner on a glass substrate, a color filter including a red layer, a green layer, and a blue layer arranged between lattices of the black matrix, a common electrode arranged in such a manner as to cover the black matrix and the color filter, and an alignment film arranged in such a manner as to cover the common electrode. The liquid crystal layer 3 is made of, for example, a nematic liquid crystal material containing liquid crystal molecules having electro-optical characteristics. The first polarizing plate 6 and the second polarizing plate 7 each includes, for example, a polarizer layer having a polarization axis in one direction, and a pair of protective layers arranged in such a manner as to sandwich the polarizer layer.

<Configurations of Backlight Unit and Optical Sheet Laminate>

Figure 2:
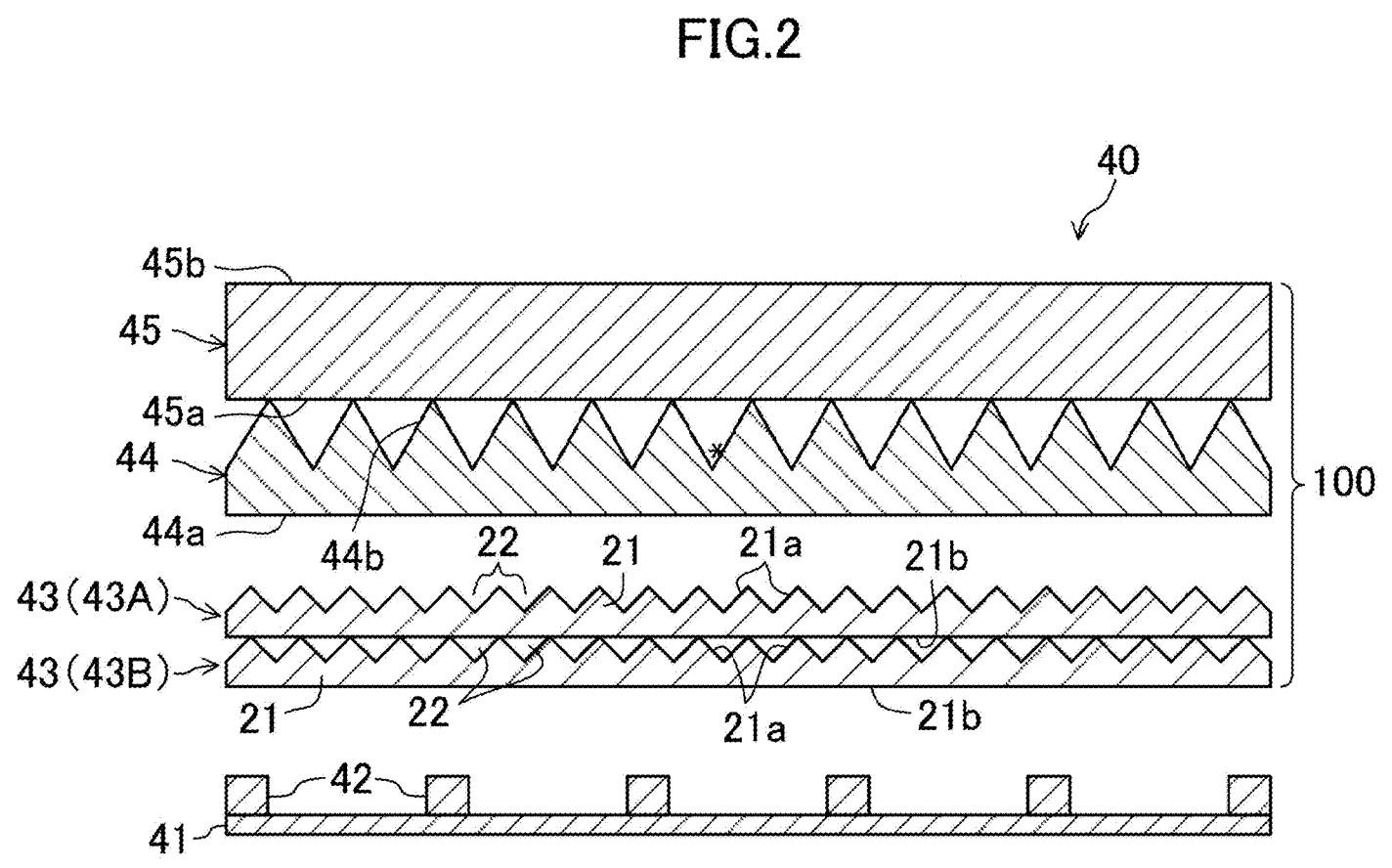

As shown in FIG. 2, the backlight unit 40 includes a reflection sheet 41, a plurality of point light sources 42 two-dimensionally arranged on the reflection sheet 41, and an optical sheet laminate 100 provided above the plurality of point light sources 42. The optical sheet laminate 100 includes a plurality of diffusion sheets 43 arranged above the point light sources 42, and a pair of prism sheets 44 and 45 provided above the plurality of diffusion sheets 43 (i.e., provided closer to the display screen 50*a*). Any sheets in the optical sheet laminate 100 may be spaced from one another. In such a case, there may be an air layer between the sheets spaced from one another.

In the present embodiment, the diffusion sheet 43 includes, e.g., two diffusion sheets each having the same structure and layered in the backlight unit 40. Specifically, the diffusion sheet 43 may include an upper diffusion sheet 43A and a lower diffusion sheet 43B. The upper diffusion sheet 43A is arranged closer to the prism sheets 44 and 45, and the lower diffusion sheet 43B is arranged closer to the point light sources 42. The diffusion sheet 43 may include three or more layered diffusion sheets 43. Note that the diffusion sheet 43 may include one diffusion sheet when the luminance uniformity can be sufficiently secured by precise arrangement of the point light sources 42 of the backlight unit 40, or the like. The pair of prism sheets 44 and 45 may be a lower prism sheet 44 and an upper prism sheet 45 having prism extending directions (directions in which prism ridges extend) perpendicular to each other. Although not shown, a polarizing sheet may be provided above the prism sheets 44 and 45 (i.e., closer to the display screen 50*a*). The polarizing sheet improves the luminance of the display screen 50*a* by preventing light emitted from the backlight unit 40 from being absorbed by the first polarizing plate 6 of the liquid crystal display device 50.

The reflection sheet 41 is formed of, e.g., a white polyethylene terephthalate resin film, a silver-deposited film, or the like.

The type of the point light sources 42 is not particularly limited. For example, an LED element, a laser element, or the like may be adopted, and an LED element may be adopted for the sake of costs, productivity, and the like. To adjust the light emission angle characteristics of the LED element, a lens may be attached to the LED element. The plurality of point light sources 42 may be, e.g., white light sources that emit light of $0.24<x<0.42$ and $0.18<y<0.48$ in the CIE1931 color coordinates. Specifically, the plurality of point light sources 42 may be configured by an LED element having the peak wavelength in a blue region, an LED element having the peak wavelength in a green region, and an LED element having the peak wavelength in a red region. The LED elements (chips) of these colors constituting the plurality of point light sources 42 may have a rectangular shape in a plan view, where each side may be 10 μm or more (preferably 50 μm or more) and 5 mm or less (preferably 1 mm or less). The LED chips corresponding to each color may be arranged two-dimensionally and alternately on the reflection sheet 41 at regular intervals. The distance between the centers of two LED chips adjacent to each other may be 0.5 mm or more (preferably 2 mm or more) and 20 mm or less.

Figure 3:
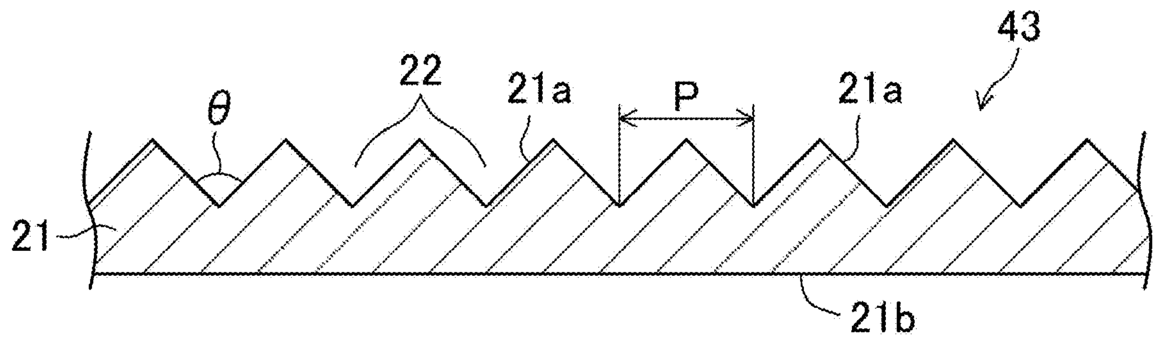
FIG. 3 is a cross-sectional view of a diffusion sheet in the optical sheet laminate of the embodiment.

Each diffusion sheet 43 includes a base material layer 21 as shown in FIG. 3. The diffusion sheet 43 includes a first surface 21*a* as a light emitting surface and a second surface 21*b* as a light incident surface. That is, the diffusion sheet 43 is arranged so that the second surface 21*b* faces the point light sources 42. The base material layer 21 is not particularly limited as long as it is formed of a resin material that transmits light, and may be, e.g., acrylic, polystyrene, polycarbonate, methyl methacrylate/styrene copolymer (MS) resin, polyethylene terephthalate, polyethylene naphthalate, cellulose acetate, polyimide, or the like. The base material layer 21 may contain a diffusion agent or other additives, or may be substantially free of additives. The additives that the base material layer 21 can contain are not particularly limited, but for example, the additives may be inorganic particles such as silica, titanium oxide, aluminum hydroxide, barium sulfate, and the like, and may be organic particles such as acrylic, acrylonitrile, silicone, polystyrene, polyamide, and the like.

The thickness of each diffusion sheet 43 is not limited, but may be, for example, 1 mm or less and 0.05 mm or more. The diffusion sheet 43 having a thickness of 1 mm or less contributes to reduction in the thickness of the backlight unit 40. The diffusion sheet 43 having a thickness of 0.05 mm or more facilitates obtaining sufficient light diffusing effect. Each diffusion sheet 43 may be in the form of a film or a plate.

Figure 4:
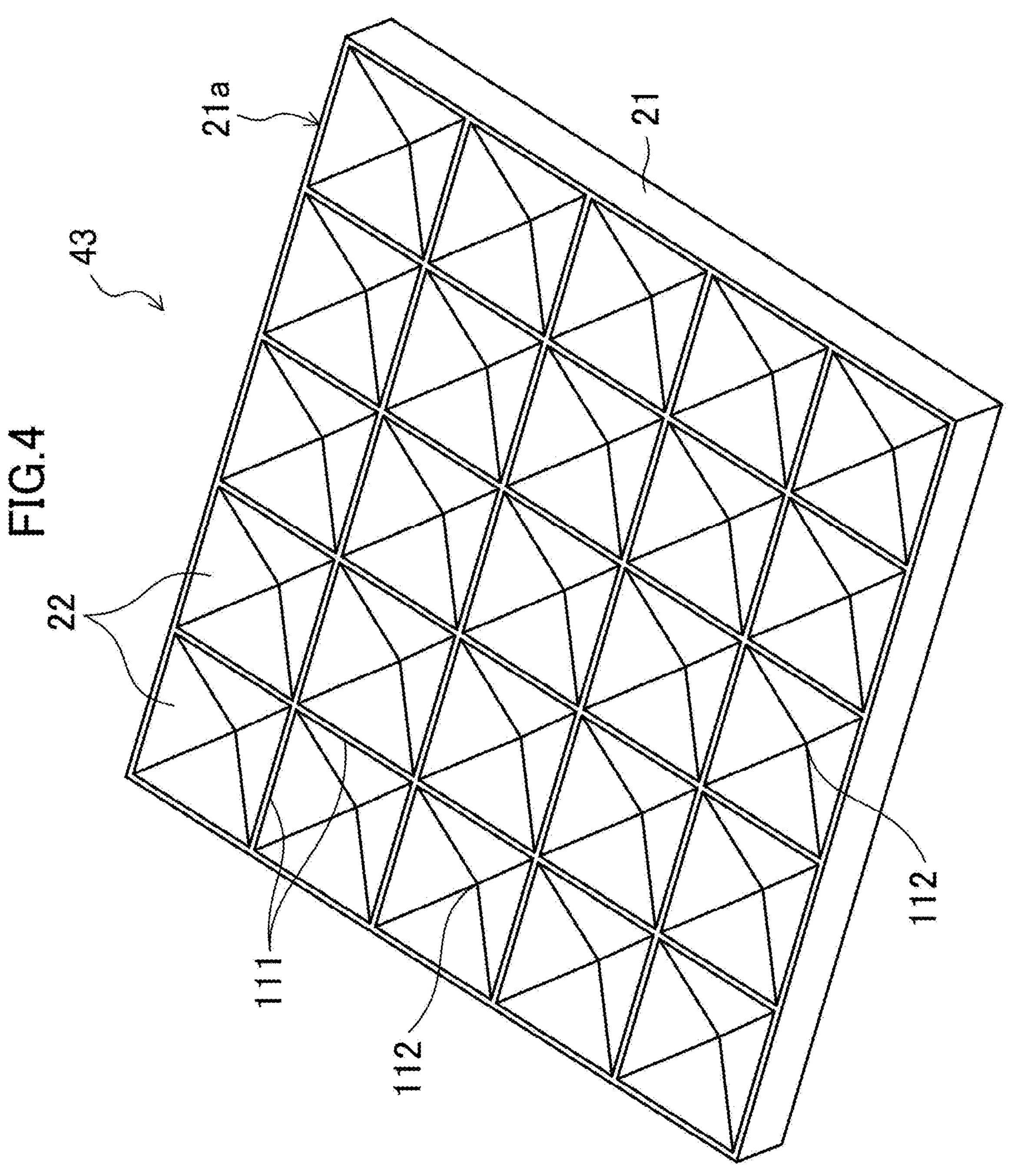
FIG. 4 is a perspective view of the diffusion sheet in the optical sheet laminate of the embodiment.

On the first surface 21*a* of each diffusion sheet 43, a plurality of recesses 22 having a substantially inverted quadrangular pyramid shape (inverted pyramid shape) are arrayed in a two-dimensional matrix as shown in FIG. 4. In other words, the plurality of recesses 22 are arrayed along two directions perpendicular to each other. The recesses 22 adjacent to each other are parted by a ridge 111. The ridge 111 extends along the two directions in which the recesses 22 are arrayed. A center 112 of the recess 22 (the apex of the inverted pyramid) is a deepest portion of the recess 22. Although FIG. 4 illustrates that the recesses 22 are arranged in a 5×5 matrix for simplicity, the actual number of the recesses 22 is much larger. In a two-dimensional array of the recesses 22, the recesses 22 may be arranged on the first surface 21*a* without a space therebetween, or may be arranged with a predetermined space therebetween. Some of the recesses 22 may be randomly arranged to the extent that the light diffusing effect is not lost. The recesses 22 may have an arrangement pitch P (see FIG. 3) of, e.g., 100 μm. The recess 22 may have a depth of, e.g., 50 μm.

Figure 5:
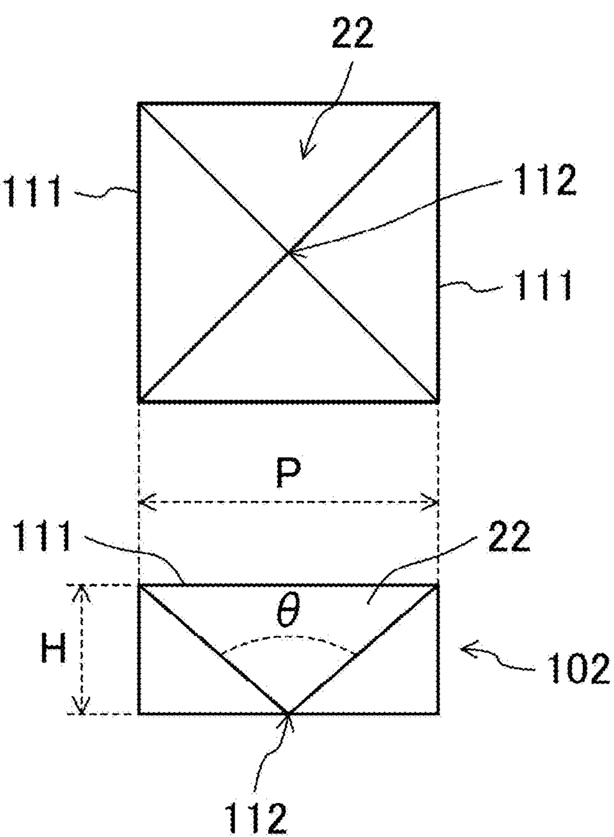
FIG. 5 shows a planer configuration and a cross-sectional configuration of recesses provided on one of surfaces of the light diffusion sheet in the optical sheet laminate of the embodiment.

In the optical sheet laminate 100 of the present embodiment, the apex angle θ (see FIG. 3) of the recess 22 is set to 95° or more. The upper limit of the apex angle θ of the recess 22 may be set to, e.g., 120° (preferably 110°) to reduce a decrease in the light diffusivity caused by the diffusion sheet 43. Here, as shown in FIG. 5, the apex angle θ of the recess 22 is an angle formed by inclined surfaces of the recess 22, in a cross-section (lower part of FIG. 5) that appears when, by a plane (longitudinal cross-section) vertical to a plane (horizontal plane) on which the diffusion sheet 43 is placed, the recess 22 is cut so as to vertically traverse a pair of ridges 111 passing through the apex 112 of the inverted pyramid, facing each other, and sandwiching the apex 112. The upper part of FIG. 5 shows the planer configuration of the recess 22. In FIG. 5, the reference character "H" represents the depth of the recess 22 (the height of the inverted pyramid shape), and the reference character "P" represents the horizontal width of the recess 22, i.e., the arrangement pitch of the recesses 22 arranged without space therebetween. The depth H of the recess 22 is determined by the arrangement pitch P of the recess 22 and the apex angle θ.

The second surface (light incident surface) 21*b* of the diffusion sheet 43 may be, e.g., a flat surface (mirror surface) or an embossed surface. Each diffusion sheet 43 may have a single layer structure consisting of the base material layer 21 with the first surface (light emission surface) 21*a* having an uneven shape (recesses 22). Each diffusion sheet 43 may have a double layer structure consisting of a base material layer having two flat surfaces and a layer having one uneven surface. Each diffusion sheet 43 may have a triple or more layer structure including a layer having one uneven surface. The production method for the diffusion sheet 43 is not particularly limited. For example, extrusion molding, injection molding, or the like may be employed.

A single layer diffusion sheet having an uneven surface may be manufactured by extrusion molding as follows. First, plastic particles as pellets (a diffusion agent may be added) are introduced into a single-screw extruder. Then, the plastic particles are heated, molten, and kneaded. After that, the molten resin extruded from a T-die is sandwiched and cooled between two metal rolls and thereafter transported by using guide rolls, and then cut off into sheet plates by a sheet cutter machine to produce diffusion sheets. Here, the molten resin is sandwiched between the metal rolls, one of which has a surface with an inverted shape of desired unevenness, and thus an inverted shape of the shape of the roll surface will be transferred onto the resin. This allows for shaping of diffusion sheets to have surfaces with the desired unevenness. The surface shapes of the rolls are not perfectly transferred onto the resin, and thus may be designed in consideration of how completely the shapes are transferred.

If a two-layered diffusion sheet with uneven surfaces is manufactured by extrusion molding, for example, plastic particles as pellets necessary for forming each layer may be introduced into each of two single-screw extruders. Then, the same procedure may be performed for each layer, and the fabricated sheets may be layered.

Alternatively, the two-layered diffusion sheet with an uneven surface may be manufactured as follows. First, plastic particles as pellets necessary for forming each layer are introduced into each of two single-screw extruders, molten by heating, and kneaded. Then, molten resin to become each layer is introduced into a single T-die, where layers of multiple molten resins are stacked, and the layers of the molten resins extruded through the T-die are then sandwiched and cooled between two metal rolls. After that, the layered molten resins are transported by guide rolls, and cut off into sheet plates using a sheet cutter machine, thus yielding a two-layered diffusion sheet with an uneven surface.

Alternatively, the diffusion sheet may be produced by shape-transfer using ultraviolet (UV) as follows. First, an uncured UV-curing resin is filled in a roll having an inverted shape of an uneven surface to be transferred, and a base material is pressed against the resin. Next, with the roll filled with UV-curing resin and the base material in one piece, the resin is cured by UV irradiation. Next, the sheet to which the uneven shape has been transferred by using the resin is released from the roll. Finally, the sheet is irradiated with ultraviolet rays again to completely cure the resin, thereby producing a diffusion sheet having an uneven surface.

In the present disclosure, the term "substantially inverted quadrangular pyramid" is used in consideration of difficulty in formation of a recess having a geometrically exact inverted quadrangular pyramid shape by an ordinary shape transfer technique. However, the "substantially inverted quadrangular pyramid" encompasses shapes that can be regarded as a true or approximately inverted quadrangular pyramid. Further, "substantial(ly)" XX means that shapes can be approximated to the XX, and "substantially inverted quadrangular pyramids" means shapes that can be approximated to the inverted quadrangular pyramids. For example, the "substantially inverted quadrangular pyramid" includes an "inverted truncated quadrangular pyramid shape" which has a flat apex and of which the area of the apex is so small that the advantages of the present invention are not lost. The "substantially inverted quadrangular pyramid" also includes a deformation of "inverted quadrangular pyramid" with unavoidable shape variations due to the processing accuracy of industrial production.

The prism sheets 44 and 45, through which the light rays need to pass, are formed mainly of a transparent (e.g., colorless and transparent) synthetic resin. The prism sheets 44 and 45 may be formed as one piece. The lower prism sheet 44 includes a base material layer 44*a* and an array of a plurality of prism projections 44*b* stacked on the surface of the base material layer 44*a*. Similarly, the upper prism sheet 45 includes a base material layer 45*a* and an array of a plurality of prism projections 45*b* stacked on the surface of the base material layer 45*a*. The prism projections 44*b* and 45*b* are stacked in a stripe pattern on the surfaces of the base material layers 44*a* and 45*a*, respectively. The prism projections 44*b* and 45*b* are triangular prisms and have back surfaces that are in contact with the surfaces of the base material layers 44*a* and 45*a*, respectively. The extending direction of the prism projections 44*b* and the extending direction of the prism projections 45*b* are perpendicular to each other. Accordingly, light rays incident from the diffusion sheet 43 can be refracted in the normal direction by the lower prism sheet 44, and light rays emitted from the lower prism sheet 44 can be further refracted by the upper prism sheet 45 in a direction substantially perpendicular to the display screen 50*a*.

The lower limit of the thickness of the prism sheets 44 and 45 (the height from the back surface of the base material layer 44*a* and 45*a* to the apex of the prism projections 44*b* and 45*b*) may be, e.g., approximately 50 μm, and more preferably approximately 100 μm. The upper limit of the thickness of the prism sheets 44 and 45 may be, e.g., approximately 200 μm, and more preferably approximately 180 μm. The lower limit of the pitch of the prism projections 44*b* and 45*b* in the prism sheets 44 and 45 may be, e.g., approximately 20 μm, and more preferably approximately 25 μm. The upper limit of the pitch of the prism projections 44*b* and 45*b* in the prism sheets 44 and 45 may be, e.g., approximately 100 μm, and more preferably approximately 60 μm. The apex angle of the prism projections 44*b* and 45*b* may be, e.g., 85° or more and 95° or less. The lower limit of the refractive index of the prism projections 44*b* and 45*b* may be, e.g., 1.5, and more preferably 1.55. The upper limit of the refractive index of the prism projections 44*b* and 45*b* may be, e.g., 1.7.

The prism sheets 44 and 45 may include the base material layers 44*a* and 45*a* and the prism projections 44*b* and 45*b*, where the prism projections 44*b* and 45*b* to which the shape transfer is applied by using an UV-curable acrylic resin are provided on the base material layers 44*a* and 45*a* made of, e.g., a PET (polyethylene terephthalate) film, or where the prism projections 44*b* and 45*b* are formed as one piece with the base material layers 44*a* and 45*a*, respectively.

Figure 6:
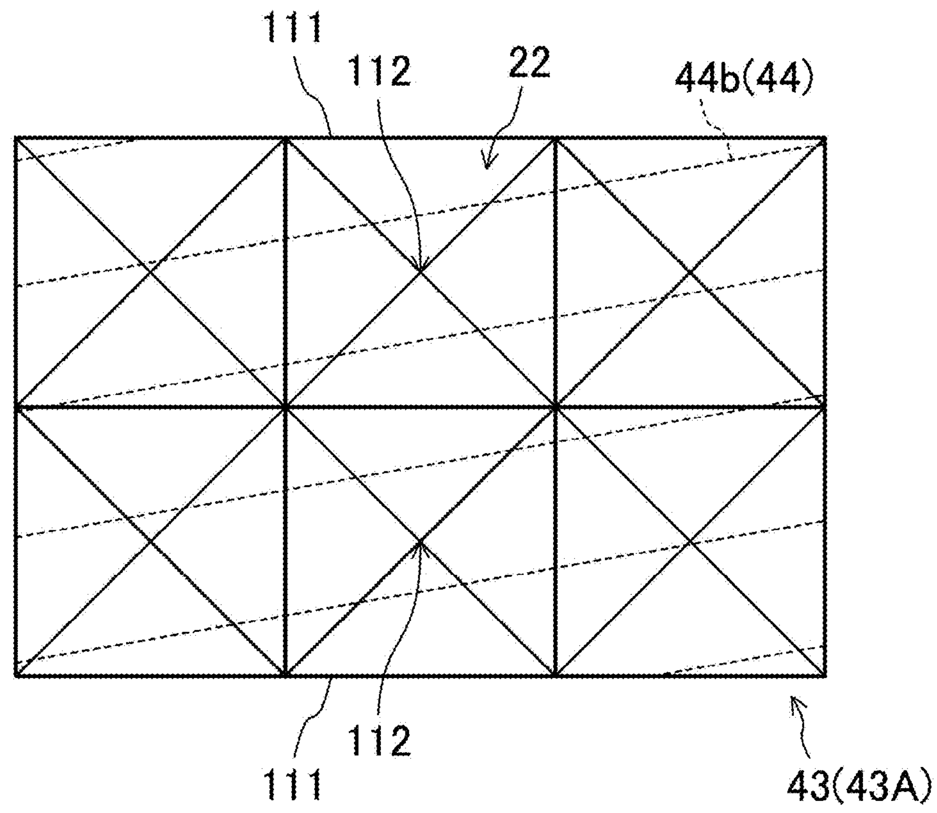
FIG. 6 shows an exemplary relationship between a recess arrangement direction of an upper diffusion sheet and a prism extending direction of a lower prism sheet in the optical sheet laminate of the embodiment.
Figure 6:
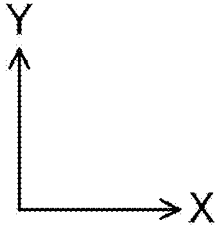

In the optical sheet laminate 100 of the present embodiment, as shown in, for example, FIG. 6, the extending direction of the prism projections 44*b* (hereinafter also referred to as prism extending direction) on the lower prism sheet 44 and the arrangement direction of the plurality of recesses 22 (X-direction and Y-direction in FIG. 6: hereinafter also referred to as recess arrangement direction) on the upper diffusion sheet 43A intersect with each other at an angular difference of 30° or less.

Features of Embodiment

The optical sheet laminate 100 of the present embodiment includes a plurality of diffusion sheets 43 each having a first surface 21*a* having a plurality of recesses 22 having a substantially inverted quadrangular pyramid shape, and a pair of prism sheets 44 and 45 having prism extending directions perpendicular to each other. The plurality of recesses 22 have an apex angle of 95° or more, and the plurality of recesses 22 are arrayed in a two-dimensional matrix. The recess arrangement direction of the upper diffusion sheet 43A, which is one of the plurality of diffusion sheets 43, and the prism extending direction of the lower prism sheet 44 intersect with each other at an angular difference of 30° or less.

With the same light sources and the same optical sheet laminate structure, the optical sheet laminate 100 of the present embodiment can provide more significantly increased in-plane luminance uniformity than when the recesses 22 having a substantially inverted quadrangular pyramid shape in each diffusion sheet 43 have an apex angle of less than 95° or when the angular difference between the recess arrangement direction of the upper diffusion sheet 43A and the prism extending direction of the lower prism sheet 44 is more than 30°. This enables less reduction in the in-plane luminance uniformity even when the backlight unit 40 is made thinner by the thickness of the diffusion sheet 43 or the number of layered diffusion sheets 43 being reduced or the like.

In the optical sheet laminate 100 of the present embodiment, when the recesses 22 have an apex angle of 120° or less, preferably 110° or less, the light diffusing effect by the recesses 22 can be less reduced.

In the optical sheet laminate 100 of the present embodiment, when the plurality of recesses 22 are provided on the light emission surface (i.e., the first surface 21*a*), which faces the lower prism sheet 44, of the upper diffusion sheet 43A, the in-plane luminance uniformity can be more increased than when the recesses 22 are provided on the light incident surface (i.e., the second surface 21*b*).

In the optical sheet laminate 100 of the present embodiment, the recess arrangement direction of the upper diffusion sheet 43A may be different from the recess arrangement direction of the lower diffusion sheet 43B. Accordingly, by adjustment to the intersecting angle between the recess arrangement direction of the upper diffusion sheet 43A and the recess arrangement direction of the lower diffusion sheet 43B, for example, a trade-off can be made between the in-plane luminance uniformity and the luminance.

The backlight unit 40 of the present embodiment is built in the liquid crystal display device 50 and leads light emitted from the plurality of point light sources 42 to the display screen 50*a*. The backlight unit 40 has the optical sheet laminate 100 of the present embodiment between the display screen 50*a* and the plurality of point light sources 42, and the plurality of diffusion sheets 43 are arranged between the plurality of point light sources 42 and the prism sheets 44 and 45.

The backlight unit 40 of the present embodiment includes the optical sheet laminate 100 of the present embodiment, and this enables less reduction in the in-plane luminance uniformity even when the backlight unit 40 is made thinner.

In the backlight unit 40 of the present embodiment, when the plurality of point light sources 42 are white light sources, it is unnecessary to provide a color conversion sheet, thus facilitating reduction in the thickness.

In the backlight unit 40 of the present embodiment, the plurality of point light sources 42 may be arranged on a reflection sheet 41 provided opposite to the display screen 50*a* when viewed from the light diffusion sheet 43. This causes multiple reflections between the diffusion sheets 43 and the reflection sheet 41 thus causing further light diffusion, and thus the luminance uniformity is improved.

In the backlight unit 40 of the present embodiment, when the distance between the plurality of point light sources 42 and the diffusion sheet 43 is 5 mm or less, the thickness of the backlight unit 40 can be reduced. In anticipation of the future reduction in thicknesses of medium-to-small-sized liquid crystal displays, the distance between the point light sources 42 and the diffusion sheet 43 may be preferably 2.5 mm or less, more preferably 1 mm or less, and ultimately 0 mm.

A production method for the backlight unit 40 of the present embodiment includes arranging a plurality of diffusion sheets 43 between the plurality of point light sources 42 and the display screen 50*a*, where the diffusion sheets 43 has a plurality of recesses 22 having a substantially inverted quadrangular pyramid shape; and arranging a pair of prism sheets 44 and 45 between the display screen 50*a* and the plurality of diffusion sheets 43, where the pair of prism sheets 44 and 45 have prism extending directions perpendicular to each other. The plurality of recesses 22 have an apex angle of 95° or more, and the plurality of recesses 22 are arrayed in a two-dimensional matrix. The plurality of diffusion sheets 43 and the pair of prism sheets 44 and 45 are arranged so that the prism extending direction of the lower prism sheet 44 and the recess arrangement direction of the upper diffusion sheet 43A intersect with each other at an angular difference of 30° or less.

With the same light sources and the same optical sheet laminate structure, the production method for the backlight unit 40 of the present embodiment can provide more significantly increased in-plane luminance uniformity than when the recesses 22 having a substantially inverted quadrangular pyramid shape in each diffusion sheet 43 have an apex angle of less than 95° or when the angular difference between the recess arrangement direction of the upper diffusion sheet 43A and the prism extending direction of the lower prism sheet 44 is more than 30°. This enables less reduction in the in-plane luminance uniformity even when the backlight unit 40 is made thinner by the thickness of the diffusion sheet 43 or the number of layered diffusion sheets 43 being reduced or the like.

The liquid crystal display device 50 of the present embodiment includes the backlight unit 40 of the present embodiment and the liquid crystal display panel 5. This enables less reduction in the in-plane luminance uniformity even when the liquid crystal display device 50 is made thinner. Information equipment (e.g., portable information equipment such as laptop computers, tablet computers, and the like) containing the liquid crystal display device 50 of the present embodiment can also achieve the similar advantages.

EXAMPLES

Examples are described below.

In an optical sheet laminate 100 of the example, a lower prism sheet 44 and an upper prism sheet 45 having prism extending directions perpendicular to each other were arranged above two diffusion sheets 43 having a thickness of 130 μm, having the same structure, and layered in the same orientation (in an orientation where the surface on which recesses 22 were formed was the light emission surface).

The diffusion sheets 43 each having a single layer structure including a base material layer 21 and recesses 22 were formed, where the base material layer 21 was formed by extrusion molding of polycarbonate, and the recesses 22 having an inverted pyramid shape with a depth of 50 μm were arranged two-dimensionally. Four types of the diffusion sheets 43 were prepared: the recesses 22 having an apex angle of 90° (for the comparative example), 95°, 100° and 105° (95° to 105° for the examples). Every diffusion sheet 43 had a light incident surface processed as a matte surface.

The prism sheets 44 and 45 included base material layers 44*a* and 45*a* made of a PET film and prism projections 44*b* and 45*b*, where the prism projections 44*b* and 45*b* were provided on the base material layers 44*a* and 45*a* by using a UV-curable acrylic resin made from acrylate. The lower prism sheet 44 had a total thickness of 145 μm, and had the prism projections 44*b* having a height of 12 μm and an apex angle of 94° and arranged at a pitch of 25 μm. The upper prism sheet 45 had a total thickness of 128 μm, and had the prism projections 45*b* having a height of 24 μm and an apex angle of 93° and arranged at a pitch of 51 μm.

The plurality of point light sources (white light sources) 42 were arranged below the optical sheet laminate 100 of each example (i.e., arranged closer to the diffusion sheet 43). The luminance and in-plane luminance uniformity (hereinafter simply referred to as "luminance uniformity") of light having passed the optical sheet laminate 100 was evaluated with variation in the layout relationship between the diffusion sheet 43 and the prism sheets 44 and 45.

Specifically, as the plurality of point light sources 42, an LED array was used which included blue LEDs with a peak wavelength of 456 nm (full width at half maximum: 19 nm), green LEDs with a peak wavelength of 535 nm (full width at half maximum: 53 nm), and red LEDs with a peak wavelength of 631 nm (full width at half maximum: 10 nm), which were alternately arranged two-dimensionally at a pitch of 8.4 mm.

Figure 7:
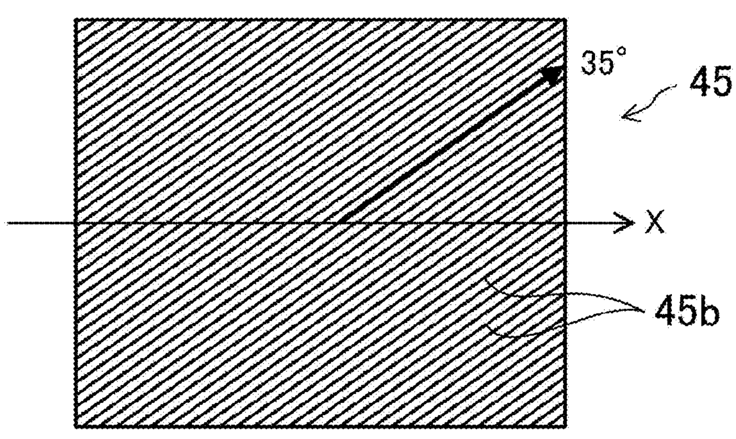
FIG. 7 is diagrams showing arrangement angles of the diffusion sheet and the prism sheets in the optical sheet laminate of the examples.
Figure 7:
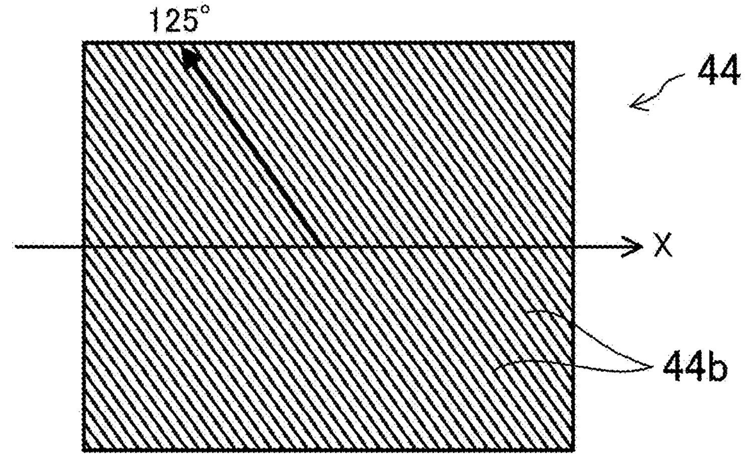
Figure 7:
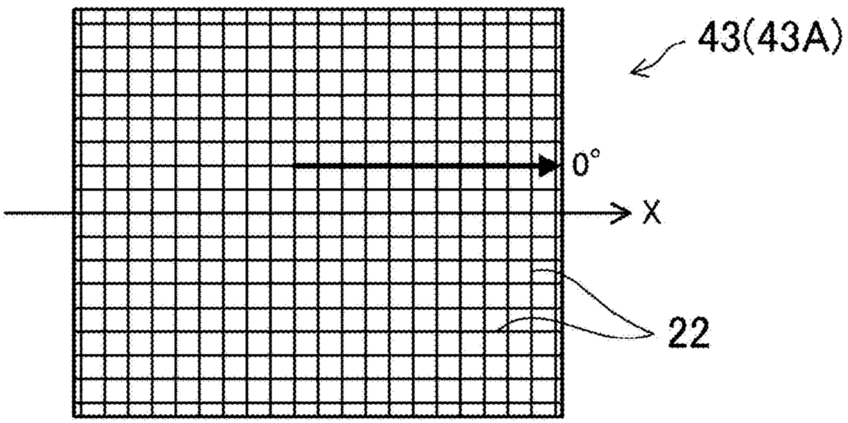

As shown in FIG. 7, in an initial state for measurement of the luminance and its uniformity, the diffusion sheets 43 were each arranged so that the arrangement direction of the recesses 22 coincided with a reference direction (X-axis direction) (i.e., arrangement angle of 0°); the lower prism sheet 44 was arranged so that the extending direction of the prism projections 44*b* was rotated counterclockwise by 125° on the X-axis (i.e., arrangement angle of 125°); and the upper prism sheet 45 was arranged so that the extending direction of the prism projections 45*b* was rotated counterclockwise by 35° on the X-axis (i.e., arrangement angle of 35°). The "reference direction" coincides with an arrangement direction of the LEDs in the plurality of point light sources 42 (the LED array described above).

In a first measurement, the arrangement direction (arrangement angle) of the two diffusion sheets 43 was rotated counterclockwise from the initial state by 10° each time and 80° in total in order to measure the luminance and its uniformity at each arrangement angle. In a second measurement, only the arrangement direction (arrangement angle) of the upper diffusion sheet 43A was rotated counterclockwise from the initial state by 10° each time and 80° in total in order to measure the luminance and its uniformity at each arrangement angle. Note that the recess arrangement direction is the same as that in the initial state when each of the diffusion sheets 43 was rotated by 90° from the initial state.

In each measurement, the optical sheet laminate 100 of the example or the comparative example was arranged above the plurality of point light sources 42 (LED array), and a transparent glass plate was placed thereabove to reduce floating of the sheets. Then, the two-dimensional spectroradiometer SR-5000HS manufactured by Topcon Technohouse Corporation was used to measure the luminance in a range of 33 mm square in the vertically upward direction (i.e., in the direction from the LED array towards the glass plate). For two-dimensional luminance distribution images obtained, variation in the light emitting intensity of individual LEDs was corrected and filtering process was conducted to reduce noises of bright/dark spots attributed to foreign materials and the like, average and standard deviation were calculated for the luminance of all the pixels. Lastly, with the definition of the "in-plane luminance uniformity" as "average value of luminance/standard deviation of luminance," the in-plane luminance uniformity was calculated for the evaluation samples of the examples and the comparative example.

Figure 8:
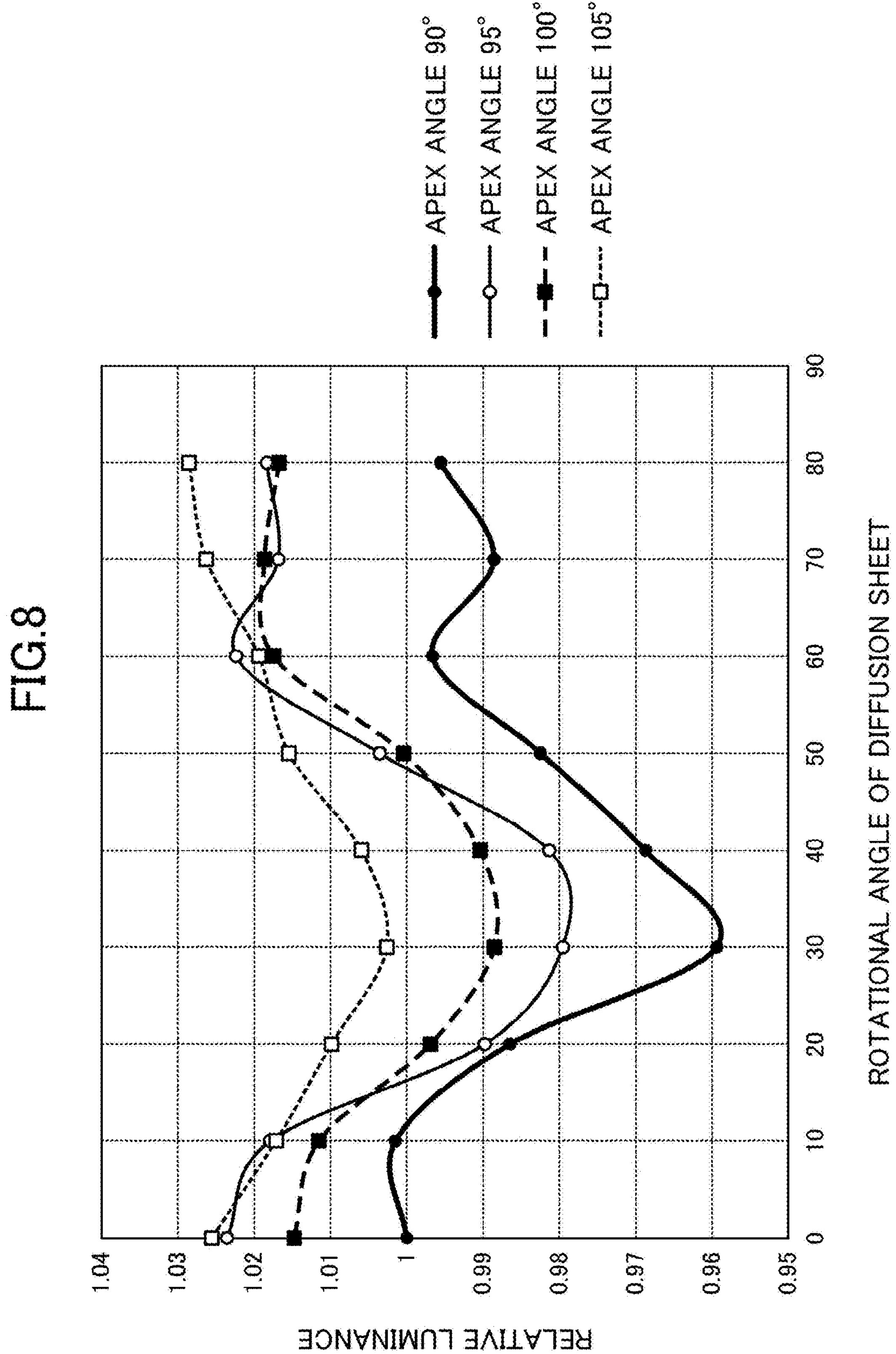
FIG. 8 is a diagram showing change in the luminance when the arrangement angles of all the diffusion sheets are changed in the optical sheet laminate of the examples.
Figure 9:
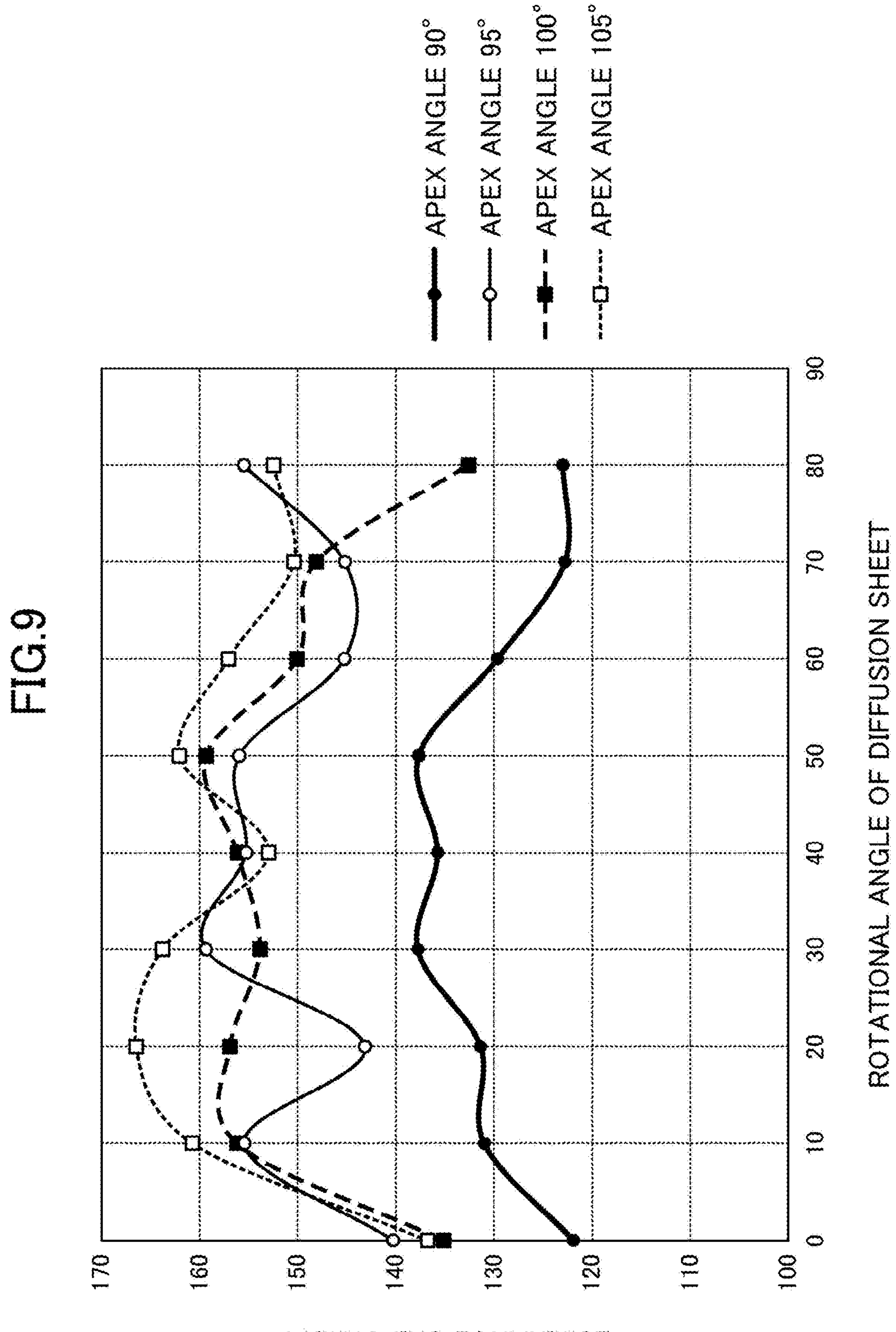
FIG. 9 is a diagram showing change in the luminance uniformity when the arrangement angles of all the diffusion sheets are changed in the optical sheet laminate of the examples.
Figure 10:
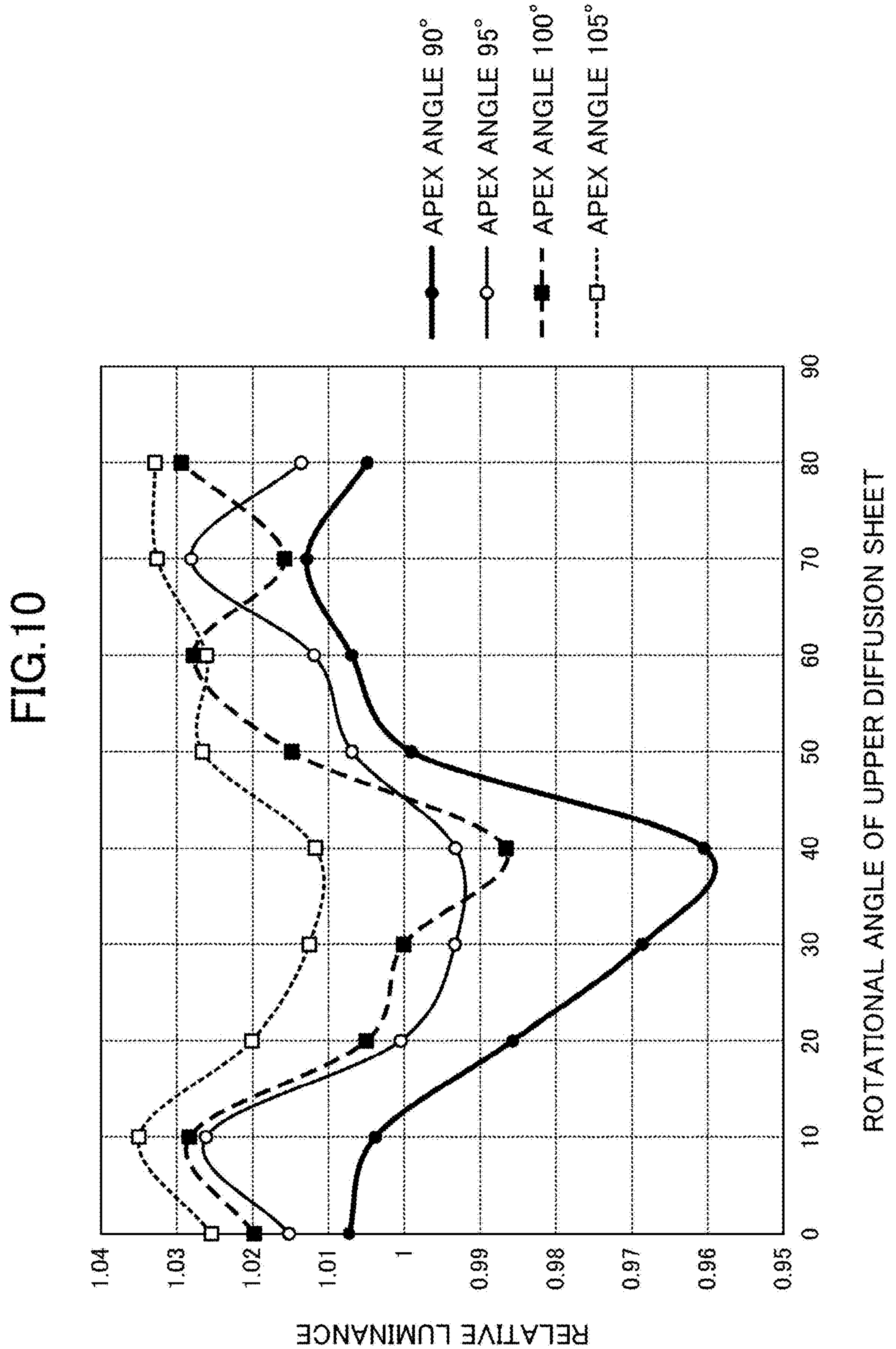
FIG. 10 is a diagram showing change in the luminance when the arrangement angle of the upper diffusion sheet is changed in the optical sheet laminate of the examples.
Figure 11:
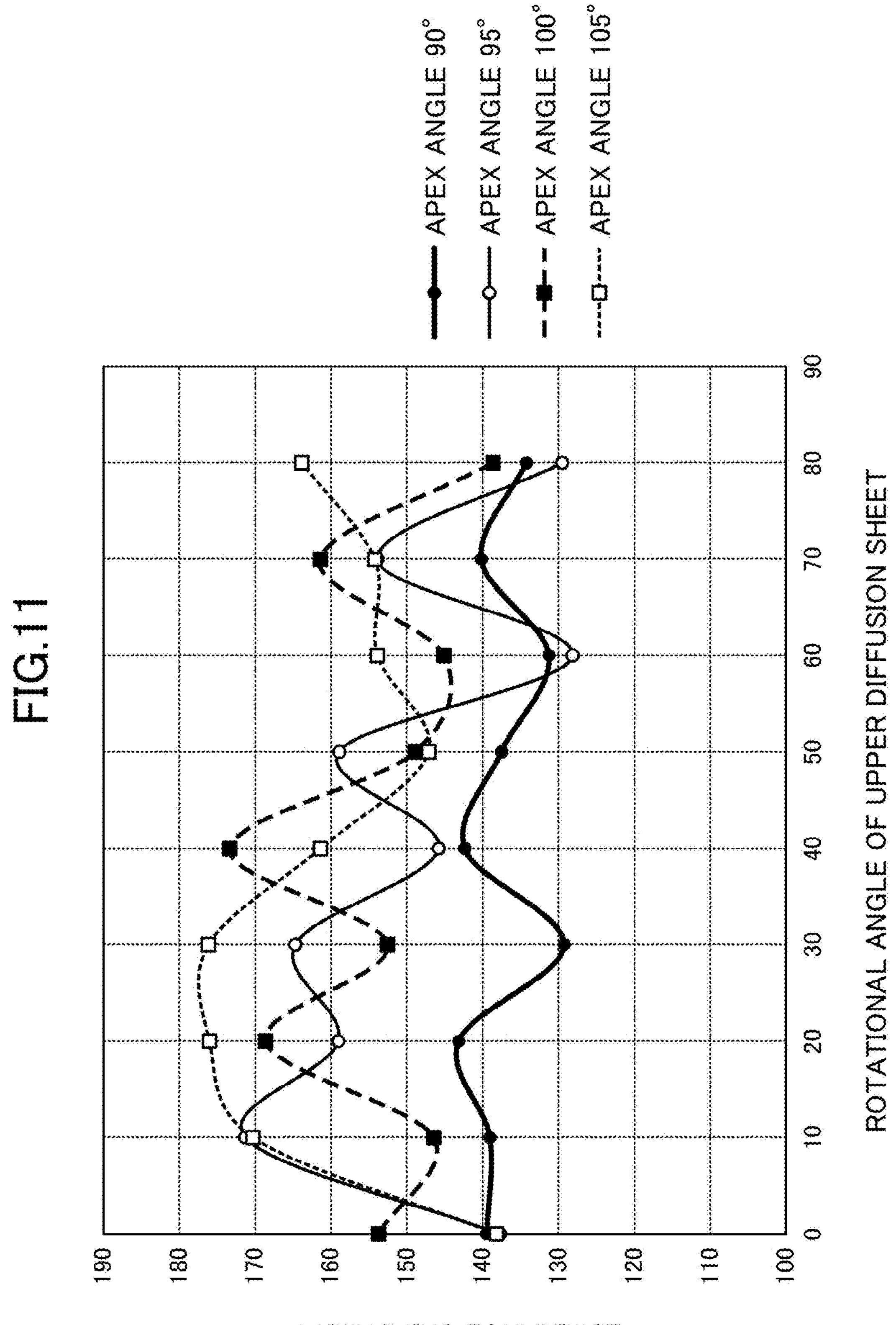
FIG. 11 is a diagram showing change in the luminance uniformity when the arrangement angle of the upper diffusion sheet is changed in the optical sheet laminate of the examples.

FIG. 8 and FIG. 9 show variation in the luminance and its uniformity obtained in the above first measurement for arrangement angles (i.e., rotational angles from 0° in the initial state) of the diffusion sheets 43 (the upper diffusion sheet 43A and the lower diffusion sheet 43B). FIG. 10 and FIG. 11 show variation in the luminance and its uniformity obtained in the above second measurement for arrangement angles (i.e., rotational angles from 0° in the initial state) of the upper diffusion sheet 43A. Note that FIG. 8 and FIG. 10 show the luminance (luminance average value of all the pixels) as a relative luminance, where the luminance obtained in the first measurement at the rotational angle of 0° for the comparative example with the recesses 22 having an apex angle of 90° was deemed as 1.

As shown in FIG. 8 and FIG. 10, in both the first and second measurements, the examples (apex angles of 95°, 100°, and 105°) resulted in a higher luminance in general and less reduction in the luminance with change in the rotational angle than the comparative example (apex angle of 90°).

As shown in FIG. 9 and FIG. 11, in both the first and second measurements, the examples (apex angles of 95°, 100°, and 105°) resulted in better luminance uniformity in general than the comparative example (apex angle of 90°). Specifically, in the first measurement (FIG. 9), the luminance uniformity of the examples was higher by approximately 20% than that of the comparative example except for the rotational angles of 0° and 80° (with the apex angle of 100°). In the second measurement (FIG. 11), the luminance uniformity of the examples was higher by approximately 10% to 20% than that of the comparative example except for the rotational angles of 0° (with the apex angles of 95° and 105°, 60°) (with the apex angle of 105°), and 80° (with the apex angles of 100° and 105°).

Here, in consideration that the arrangement angle of the lower prism sheet 44 is 125° and that each diffusion sheet 43 has an equivalent shape at arrangement angles of 0° (180°) and 90 (270°), it has been found that each example results in favorable luminance uniformity when the prism extending direction of the lower prism sheet 44 and the recess arrangement direction of the upper diffusion sheet 43A intersect with each other at an angular difference of 30° or less (more preferably 20° or less).

Other Embodiments

In the above embodiment (including the examples: the same applies to the following description), the optical sheet laminate 100 includes the diffusion sheet 43 and the prism sheets 44 and 45. Alternatively, the optical sheet laminate 100 may include other optical sheets than the diffusion sheet 43 and the prism sheets 44 and 45. For example, when the plurality of point light sources 42 are blue light sources, a color conversion sheet such as a quantum dot (QD) sheet, a fluorescent sheet, or the like which converts blue light into white light may be arranged between the plurality of point light sources 42 and the lower diffusion sheet 43B. Alternatively, another optical sheet that substantially does not affect the optical characteristics of the backlight unit 40 may be interposed between the upper diffusion sheet 43A and the lower prism sheet 44.

In the above embodiment, the first surfaces (light emission surfaces) 21*a* of all the diffusion sheets 43 in the optical sheet laminate 100 are provided with the recesses 22. Instead, the second surface (light incident surface) 21*b* of the lower diffusion sheet 43B (at least one of the diffusion sheets 43 except the upper diffusion sheet 43A when three or more diffusion sheets 43 are layered) may be provided with the recesses 22. The second surface 21*b* of each diffusion sheet 43 is either a flat surface (mirror surface) or an embossed surface. Alternatively, the second surface 21*b* of each diffusion sheet 43 may be provided with recesses having an inverted polygon pyramid shape and capable of being arranged two-dimensionally, or an array of projections such as prism projections. The plurality of diffusion sheets 43 may be combination of some types of diffusion sheets with the base material layers 21 made of different materials or the recesses 22 having different structures.

The above describes the embodiments of the present disclosure. However, the present disclosure is not limited only to the aforementioned embodiments, and various modifications are possible within the scope of the disclosure. That is, the above description of the embodiments is solely to serve as an example in nature, and is not intended to limit the present disclosure, applications thereof, or uses thereof.

The invention claimed is:

1. A diffusion sheet laminate in a backlight unit, the diffusion sheet laminate comprising:
- a plurality of diffusion sheets each having surfaces, at least one of which has a plurality of recesses having a substantially inverted quadrangular pyramid shape,
- wherein:
  - the plurality of recesses have an apex angle of 95° or more,
  - the plurality of recesses are arrayed in a two-dimensional matrix, and
  - the diffusion sheet laminate is built under a pair of prism sheets having prism extending directions perpendicular to each other in the backlight unit, a prism extending direction of a lower prism sheet which is one of the pair of prism sheets and is closer to the plurality of diffusion sheets and an arrangement direction of the plurality of recesses on an upper diffusion sheet which is one of the plurality of diffusion sheets and is closest to the lower prism sheet intersect with each other at an angular difference of 30° or less.

2. The diffusion sheet laminate of claim 1, wherein the apex angle is 120° or less.

3. The diffusion sheet laminate of claim 2, wherein the apex angle is 110° or less.

4. The diffusion sheet laminate of claim 1, wherein another optical sheet is not interposed between the upper diffusion sheet and the lower prism sheet.

5. The diffusion sheet laminate of claim 1, wherein the plurality of recesses are provided on a light emission surface of the upper diffusion sheet which faces the lower prism sheet.

6. The diffusion sheet laminate of claim 1, wherein the plurality of diffusion sheets include a lower diffusion sheet on which an arrangement direction of the plurality of recesses is different from the arrangement direction of the plurality of recesses on the upper diffusion sheet.

7. A backlight unit built in a liquid crystal display device and leading light emitted from a plurality of point light sources toward a display screen, comprising:
- the diffusion sheet laminate of claim 1, and
- the pair of prism sheets having prism extending directions perpendicular to each other are disposed between the display screen and the plurality of point light sources,
- wherein the plurality of diffusion sheets are arranged between the plurality of point light sources and the pair of prism sheets.

8. The backlight unit of claim 7, wherein the plurality of point light sources are white light sources.

9. The backlight unit of claim 7, wherein the plurality of point light sources are arranged on a reflection sheet provided opposite to the display screen when viewed from the plurality of diffusion sheets.

10. The backlight unit of claim 7, wherein a distance between the plurality of point light sources and the plurality of diffusion sheets is 5 mm or less.

11. A liquid crystal display device, comprising:

the backlight unit of claim 7; and a liquid crystal display panel.

12. An information equipment, comprising the liquid crystal display device of claim 11.

* * * * *